(12) United States Patent
Lin et al.

(10) Patent No.: US 12,448,036 B2
(45) Date of Patent: Oct. 21, 2025

(54) VEHICLE OSCILLATION CONTROL

(71) Applicant: GM Global Technology Operations LLC, Detroit, MI (US)

(72) Inventors: Wen-Chiao Lin, Rochester Hills, MI (US); Bo Yu, Novi, MI (US); Raed Nasim Abuaita, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 258 days.

(21) Appl. No.: 18/308,803

(22) Filed: Apr. 28, 2023

(65) Prior Publication Data

US 2024/0359734 A1 Oct. 31, 2024

(51) Int. Cl.
*B62D 1/00* (2006.01)
*B62D 6/00* (2006.01)
*B62D 15/00* (2006.01)

(52) U.S. Cl.
CPC ............. *B62D 6/008* (2013.01); *B62D 15/00* (2013.01)

(58) Field of Classification Search
CPC ...... B62D 6/008; B62D 15/00; B62D 5/0481; B62D 5/0472; B62D 6/06; B62D 1/00
USPC .......................................................... 701/41
See application file for complete search history.

(56) References Cited

U.S. PATENT DOCUMENTS

2022/0332367 A1* 10/2022 Akatsuka ............. B62D 15/025
2022/0410967 A1* 12/2022 Akatsuka ............. B62D 5/0481

* cited by examiner

*Primary Examiner* — Shardul D Patel
(74) *Attorney, Agent, or Firm* — CANTOR COLBURN LLP (57) ABSTRACT

Techniques are provided for vehicle oscillation control. In one embodiment, the techniques involve identifying an oscillation at a steering wheel or steering column of a vehicle, upon determining that the oscillation exceeds an oscillation of interest threshold, identifying the oscillation as an oscillation of interest, classifying a cause of the oscillation of interest, and mitigating the oscillation of interest based on the classification of the cause.

20 Claims, 7 Drawing Sheets

VEHICLE OSCILLATION CONTROL

INTRODUCTION

The subject disclosure relates to vehicle oscillation control, and more specifically to detecting and mitigating oscillations based on power steering features of a vehicle.

Power steering systems can reduce the effort needed to turn a steering wheel of a vehicle, thereby aiding a driver in maneuvering the vehicle. However, the power steering systems can cause oscillations at the steering wheel due to design limitations, driving and road conditions, and worn parts of the power steering systems. These oscillations can cause discomfort, vehicle instability, and otherwise degraded driving experiences.

SUMMARY

In one exemplary embodiment, a method is provided to mitigate an oscillation of a vehicle. The method includes identifying an oscillation at a steering wheel or steering column of a vehicle, upon determining that the oscillation exceeds an oscillation of interest threshold, identifying the oscillation as an oscillation of interest, classifying a cause of the oscillation of interest, and mitigating the oscillation of interest based on the classification of the cause.

In addition to one or more of the features described herein, the method also includes determining a driving scenario score based on vehicle features of the vehicle, wherein the vehicle features include at least one of: (i) a vehicle speed, (ii) a steering wheel angle, (iii) a steering wheel angle gradient, or (iv) a yaw rate of wheels of the vehicle, and adjusting the mitigation of the oscillation of interest based on the driving scenario score.

In addition to one or more of the features described herein, the cause of the oscillation of interest comprises one of: (i) a contributor, (ii) an intervening contributor, or (iii) a power steering feature, and the cause is classified as one of: (i) a cause of the oscillation of interest, (ii) a non-cause of the oscillation of interest, or (iii) an indeterminate cause of the oscillation of interest.

In addition to one or more of the features described herein, upon determining that a first cause and a second cause comprise a respective first and second power steering feature, and upon determining that the first and second power steering features are classified as indeterminate causes of the oscillation of interest, the cause of the oscillation of interest is classified as unknown.

In addition to one or more of the features described herein, the contributor includes at least one of: (i) an oscillation harmonic of a wheel angular velocity, (ii) an oscillation harmonic of a deceleration of the vehicle, (iii) an IMU measurement, (iv) a wheel displacement, or (v) an oscillation harmonic of a propulsion system of the vehicle, and classifying the contributor involves comparing the contributor to a contributor cause threshold.

In addition to one or more of the features described herein, the cause of the oscillation of interest comprises a power steering feature, and classifying the power steering feature involves reducing or disabling an assistance of the power steering feature, assessing a difference of an intervening contributor, and assessing a difference of the oscillation of interest.

In addition to one or more of the features described herein, mitigating the oscillation of interest includes at least one of: (i) stopping the vehicle, (ii) increasing or enabling assistance of a power steering feature, (iii) maintaining a reduced or disabled assistance of a power steering feature, or (iv) reducing a torque of a steering motor of the vehicle.

In another exemplary embodiment, a system is provided to mitigate an oscillation of a vehicle. The system includes a processor, and memory or storage comprising an algorithm or computer instructions, which when executed by the processor, performs an operation that includes identifying an oscillation at a steering wheel or steering column of a vehicle, upon determining that the oscillation exceeds an oscillation of interest threshold, identifying the oscillation as an oscillation of interest, classifying a cause of the oscillation of interest, and mitigating the oscillation of interest based on the classification of the cause.

In addition to one or more of the features described herein, the operation also includes determining a driving scenario score based on vehicle features of the vehicle, wherein the vehicle features include at least one of: (i) a vehicle speed, (ii) a steering wheel angle, (iii) a steering wheel angle gradient, or (iv) a yaw rate of wheels of the vehicle, and adjusting the mitigation of the oscillation of interest based on the driving scenario score.

In addition to one or more of the features described herein, the cause of the oscillation of interest comprises one of: (i) a contributor, (ii) an intervening contributor, or (iii) a power steering feature, and the cause is classified as one of: (i) a cause of the oscillation of interest, (ii) a non-cause of the oscillation of interest, or (iii) an indeterminate cause of the oscillation of interest.

In addition to one or more of the features described herein, upon determining that a first cause and a second cause comprise a respective first and second power steering feature, and upon determining that the first and second power steering features are classified as indeterminate causes of the oscillation of interest, the cause of the oscillation of interest is classified as unknown.

In addition to one or more of the features described herein, the contributor includes at least one of: (i) an oscillation harmonic of a wheel angular velocity, (ii) an oscillation harmonic of a deceleration of the vehicle, (iii) an IMU measurement, (iv) a wheel displacement, or (v) an oscillation harmonic of a propulsion system of the vehicle, and classifying the contributor involves comparing the contributor to a contributor cause threshold.

In addition to one or more of the features described herein, the cause of the oscillation of interest comprises a power steering feature, and classifying the power steering feature involves reducing or disabling an assistance of the power steering feature, assessing a difference of an intervening contributor, and assessing a difference of the oscillation of interest.

In addition to one or more of the features described herein, mitigating the oscillation of interest includes at least one of: (i) stopping the vehicle, (ii) increasing or enabling assistance of a power steering feature, (iii) maintaining a reduced or disabled assistance of a power steering feature, or (iv) reducing a torque of a steering motor of the vehicle.

In yet another exemplary embodiment, a computer-readable storage medium having computer-readable program code embodied therewith is provided to mitigate an oscillation of a vehicle. The computer-readable program code is executable by one or more computer processors to perform an operation that includes identifying an oscillation at a steering wheel or steering column of a vehicle, upon determining that the oscillation exceeds an oscillation of interest threshold, identifying the oscillation as an oscillation of interest, classifying a cause of the oscillation of interest, and mitigating the oscillation of interest based on the classification of the cause.

In addition to one or more of the features described herein, the operation also includes determining a driving scenario score based on vehicle features of the vehicle, wherein the vehicle features include at least one of: (i) a vehicle speed, (ii) a steering wheel angle, (iii) a steering wheel angle gradient, or (iv) a yaw rate of wheels of the vehicle, and adjusting the mitigation of the oscillation of interest based on the driving scenario score.

In addition to one or more of the features described herein, the cause of the oscillation of interest comprises one of: (i) a contributor, (ii) an intervening contributor, or (iii) a power steering feature, and the cause is classified as one of: (i) a cause of the oscillation of interest, (ii) a non-cause of the oscillation of interest, or (iii) an indeterminate cause of the oscillation of interest.

In addition to one or more of the features described herein, upon determining that a first cause and a second cause comprise a respective first and second power steering feature, and upon determining that the first and second power steering features are classified as indeterminate causes of the oscillation of interest, the cause of the oscillation of interest is classified as unknown.

In addition to one or more of the features described herein, the cause of the oscillation of interest comprises a power steering feature, and classifying the power steering feature involves reducing or disabling an assistance of the power steering feature, assessing a difference of an intervening contributor, and assessing a difference of the oscillation of interest.

In addition to one or more of the features described herein, mitigating the oscillation of interest includes at least one of: (i) stopping the vehicle, (ii) increasing or enabling assistance of a power steering feature, (iii) maintaining a reduced or disabled assistance of a power steering feature, or (iv) reducing a torque of a steering motor of the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure improve upon power steering systems by enabling real-time oscillation detection and mitigation. In one embodiment, oscillations at a steering wheel or steering column of a vehicle are identified and mitigated when the oscillations degrade a driving experience. In one embodiment, techniques for mitigating the oscillations are selected by reducing or disabling assistance of a power steering feature, and assessing a resultant change in the oscillation. The techniques can also be adjusted by a machine learning algorithm that changes an extent to which a given technique is applied to the oscillation.

One benefit of the disclosed embodiments is to address oscillations due to power steering features in real-time, thereby supplementing efforts taken during vehicle design and production to improve the driving experience. Further, embodiments of the present disclosure can improve driving experiences by minimizing oscillations at the wheel of the vehicle.

Figure 1:
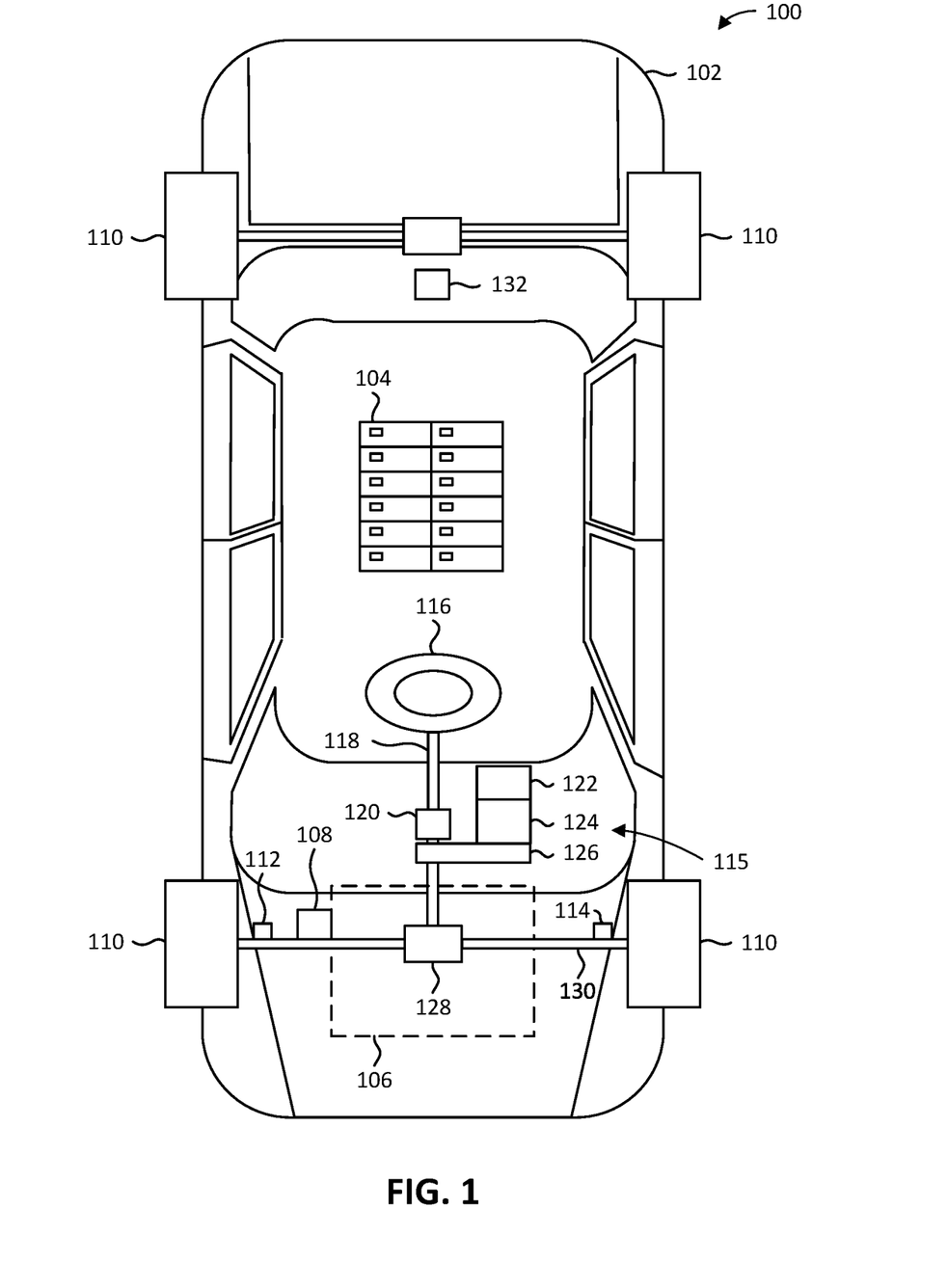
FIG. 1 illustrates a vehicle, according to one embodiment.

FIG. 1 illustrates a vehicle 100, according to one embodiment. The vehicle 100 includes a body 102, which can support a power system 104, propulsion system 106, a sensor system, a power steering system 115, and other systems of the vehicle 100 described herein.

In one embodiment, the vehicle 100 is an internal combustion engine (ICE) vehicle, an electric vehicle (EV), or a hybrid electric vehicle (HEV). In the illustrated embodiment, the vehicle 100 is an HEV that is partially powered by the power system 104, which includes multiple interconnect battery cells. The power system 104 can be electrically coupled to at least one electric motor assembly of the propulsion system 106. In one embodiment, the power system 104 is electrically coupled to a direct current (DC) converter module (e.g., a DC-DC converter) and multiple inverter modules (e.g., traction power inversion units). The inverter modules can convert DC from the power system 104 to a three-phase alternating current (AC) to drive the electric motors of the propulsion system 106. The power system 104 can also be electrically coupled to vehicle electronics systems such as audio systems, display systems, navigation systems, temperature control systems, or the like.

The propulsion system 106 can include an ICE system and at least one electric motor assembly. Each component of the propulsion system 106 can be configured to drive at least one the wheels 110 of the vehicle 100 via a transmission system coupled to a front axle shaft or a rear axle shaft, which are coupled to a respective front and rear set of the wheels 110.

The sensor system includes a variety of sensors disposed on, or integrated with, various components of the vehicle 100. In the illustrated embodiment, the sensor system includes a motor torque sensor 108, a wheel angular velocity sensor 112, a wheel displacement sensor 114, a steering sensor 120, and an inertial measurement unit (IMU) 132, which are communicatively coupled to at least one electronic control unit (ECU) (e.g., steering ECU 122). In one embodiment, ECUs are systems that manage electronic operations of the propulsion system 106 and other systems of the vehicle 100. ECUs are described in greater detail in FIG. 2 below.

When the propulsion system 106 drives the wheels 110, the motor torque sensor 108 can measure a torque output generated by the propulsion system 106. The motor torque sensor 108 can include a torque sensor, a current sensor, or the like, communicatively coupled to an ECU, such as a powertrain control module.

The wheel angular velocity sensor 112 can measure an angular velocity of the wheels 110. Although one wheel angular velocity sensor 112 is shown in the illustrated embodiment, additional sensors can be placed near the wheel hubs or braking systems of each of the wheels 110 to measure the angular velocity of the individual wheels 110. In one embodiment, the wheel angular velocity sensor 112 includes a wheel speed sensor, a Hall effect sensor, an optical sensor, or the like, communicatively coupled to an ECU, such as an engine control module.

The wheel displacement sensor 114 can measure a displacement of the wheels. Although one wheel displacement sensor 114 is shown in the illustrated embodiment, additional sensors can be placed near the wheel hubs or braking systems of each of the wheels 110 to measure the wheel displacement of the individual wheels 110. In one embodiment, the wheel displacement sensor 114 includes a wheel speed sensor, an accelerometer, a strain gauge, or the like, communicatively coupled to an ECU.

The IMU 132 can be disposed on any component of the vehicle 100 to generate positional and movement data of the vehicle 100 across multiple degrees of freedom. Although one IMU 132 is shown in the illustrated embodiment, additional IMUs can be placed throughout the vehicle 100 to provide more accurate positional and movement data (e.g., for stability control systems, and collision avoidance systems). In one embodiment, the IMU 132 includes an accelerometer, a gyroscope, and a magnetometer coupled to an ECU.

The power steering system 115 can reduce the effort needed to turn a steering wheel of the vehicle 100, thereby aiding a driver in maneuvering the vehicle 100. Examples of the power steering system 115 include a hydraulic power steering (HPS) system, an electric power steering (EPS) system, an electro-hydraulic power steering (EHPS) system, or the like. In the illustrated embodiment, the power steering system 115 is an EPS that includes a steering wheel 116, a steering column 118, a steering sensor 120, a steering ECU 122, a steering motor 124, a reduction gear 126, a pinion gear 128, and a steering rack 130.

The steering wheel 116 is connected to the steering column 118, such that rotating the steering wheel 116 generates a torque output that causes a proportional rotation of the steering column 118. Further, vibrations in either the steering wheel 116 or the steering column 118 can reverberate throughout the steering column 118 or steering wheel 116, respectively.

In one embodiment, the steering sensor 120 is a torque sensor disposed on, or integrated with, the steering column 118. The steering sensor 120 can be coupled to the steering ECU 122. In the illustrated embodiment, when the steering wheel 116 is rotated, the steering sensor 120 measures the resultant torque of the steering column 118, and transmits the measurement to the steering ECU 122.

The steering ECU 122 can receive measurements from the sensor system, or from ECUs coupled to the sensor system, to determine an amount of torque assistance to apply to the steering column 118. In one embodiment, the amount of torque assistance is calculated in direct proportion to driving conditions (e.g., the speed of the vehicle 110) determined from the measurements. When the steering ECU 122 determines that torque assistance is needed to aid the driver in maneuvering the vehicle 100, the steering ECU 122 transmits a signal to the steering motor 124 to generate the power needed to effectuate the determined amount of torque assistance. The power from the steering motor 124 is applied to the reduction gear 126, which applies a corresponding torque assistance to the steering column 118.

The steering column 118 is connected to the pinion gear 128, such that the torque of the steering column 118 is translated to a linear force in the steering rack 130 via the pinion gear 128. The steering rack 130 is connected to the wheels 110 via tie rods and a suspension system (not shown), such that the linear force in the steering rack 130 can rotate the wheels 110 to steer the vehicle. In this manner, the torque applied to the steering wheel 116 by the driver can be augmented by the torque assistance applied to the steering column 118 by the reduction gear 126, which reduces the effort needed by the driver to steer the vehicle 100.

In one embodiment, the steering ECU 122 includes oscillation mitigation features that mitigate oscillations of interest (OOIs) of the vehicle 100. The steering ECU 122 is discussed in greater detail in FIG. 2.

The oscillation mitigation features can identify OOIs at the steering wheel 116 and steering column 118. This process is discussed in further detail in FIG. 3.

The oscillation mitigation features can also determine and classify causes of the OOIs. These processes are discussed in further detail in FIGS. 4-5.

The oscillation mitigation features can also mitigate the OOIs based on the causes of the OOIs. This process is discussed in greater detail in FIG. 6.

The oscillation mitigation features can also train and use a machine learning model to adjust oscillation mitigation strategies. This process is discussed in greater detail in FIG. 7.

Figure 2:
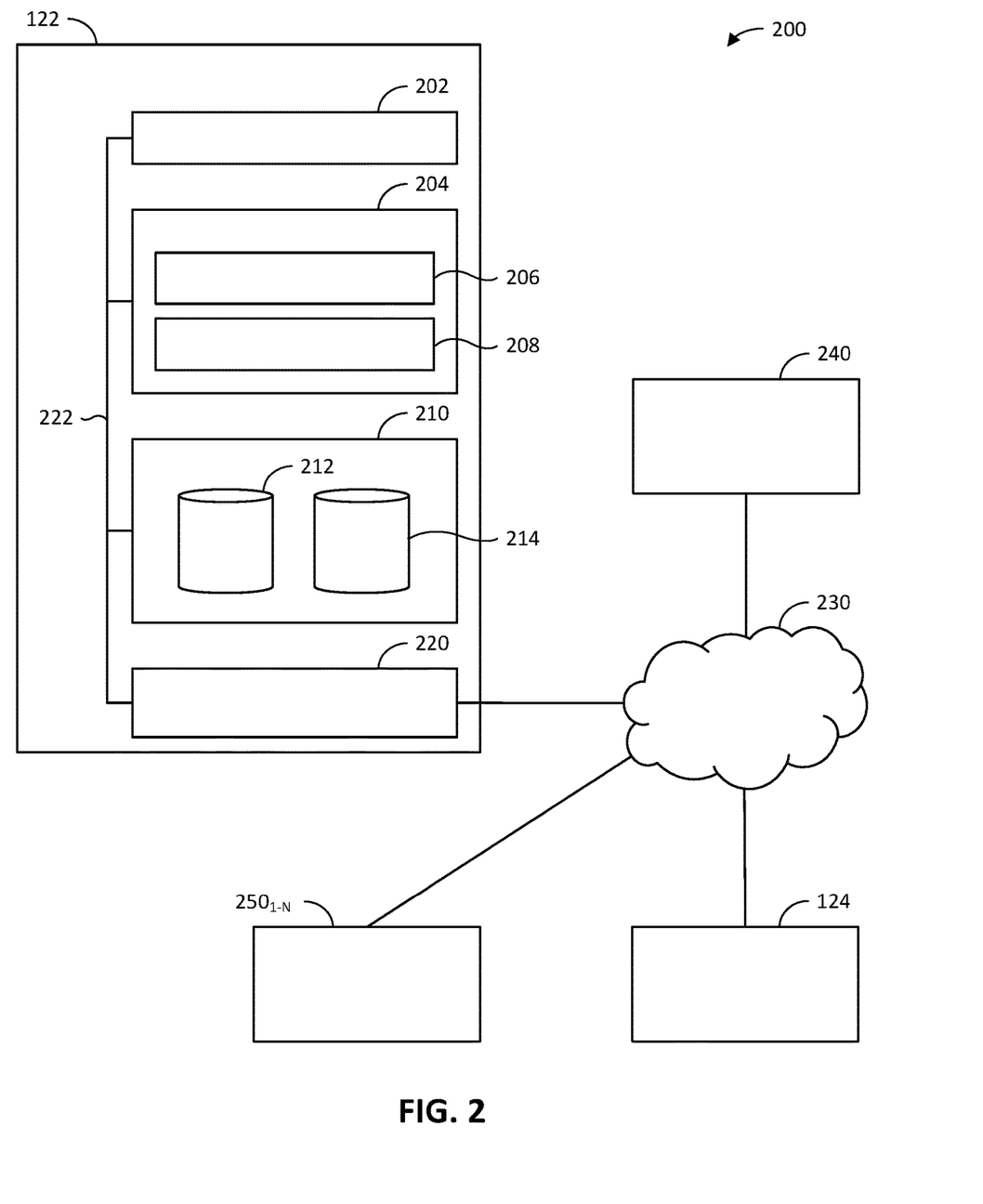
FIG. 2 illustrates a computing environment, according to one embodiment.

FIG. 2 illustrates a computing environment 200, according to one embodiment. In the illustrated embodiment, the computing environment 200 includes a steering ECU 122, a network 230, a sensor system 240, ECUs $250_{1-N}$, and a steering motor 124.

In one embodiment, the steering ECU 122 includes a processor 202 that obtains instructions and data via a bus 222 from memory 204 or storage 210. Not all components of the steering ECU 122 are shown. The steering ECU 122 is generally under the control of an operating system (OS) suitable to perform or support the functions or processes disclosed herein. The processor 202 is a programmable logic device that performs instruction, logic, and mathematical processing, and may be representative of one or more CPUs. The processor may execute one or more algorithms, instruction sets, or applications in memory 204 or storage 210 to perform the functions or processes described herein.

The memory 204 and storage 210 can be representative of hard-disk drives, solid state drives, flash memory devices, optical media, and the like. The storage 210 can also include structured storage (e.g., a database). In addition, the memory 204 and storage 210 may be considered to include memory physically located elsewhere. For example, the memory 204 and storage 210 may be physically located on another computer, or ECU, communicatively coupled to the steering ECU 122 via the bus 222 or the network 230.

The steering ECU 122 can be connected to other computers (e.g., distributed databases, servers, or web-hosts), the sensor system 240, ECUs $250_{1-N}$, or the steering motor 124 via a network interface 220 and the network 230. The network 230 can include a controller area network (CAN) or transmission control protocol (TCP) bus. In one embodiment, the network 230 includes a local area network, a wide area network, or a wireless network. The network 230 can also include any combination of physical transmission cables, optical transmission fibers, wireless transmission, routers, firewalls, switches, gateway computers or edge servers. The network interface 220 may be any type of network communications device allowing the steering ECU 122 to communicate with computers and other components of the computing environment 200 via the network 230. The network interface 220 may exchange data with the network 230.

As described above, the sensor system 240 can include a variety of sensors disposed on, or integrated with, various components of the vehicle 100. The sensor system 240 can include the motor torque sensor 108, the wheel angular velocity sensor 112, the wheel displacement sensor 114, the steering sensor 120, and the IMU 132, or the like, which are communicatively coupled to at least one of the ECUs $250_{1-N}$. In one embodiment, the sensor system 240 is configured to transmit measurements from these sensors to the steering ECU 122 via the network 230. The steering ECU 122 can store the measurements as sensor data 212 in the storage 210.

In the illustrated embodiment, the ECUs $250_{1-N}$ include a structure comparable to steering ECU 122. Examples of the ECUs $250_{1-N}$ include an engine control module (ECM), a powertrain control module (PCM), a transmission control module (TCM), an anti-lock brake system control module (ABS), an airbag control module (ACM), a body control module (BCM), a climate control module (CCM), and the like. In one embodiment, one of the ECUs $250_{1-N}$ process measurements and data from the sensor system 240, or from other ECUs $250_{1-N}$, to generate data used by the steering ECU 122. For example, an ECM may process measurements from the wheel angular velocity sensor 112, and the wheel displacement sensor 114, to generate data about a current speed of the vehicle 100. This data can be transmitted to the steering ECU 122, which can store the data as ECU data 214 in the storage 210.

In the illustrated embodiment, the memory 204 includes an oscillation mitigator 206 and machine learning algorithm 208. In one embodiment, the oscillation mitigator 206 and machine learning algorithm 208 each represent one or more algorithms, instruction sets, software applications, or other computer-readable program code that can be executed by the processor 202 to perform the functions, operations, or processes described herein.

Figure 3:
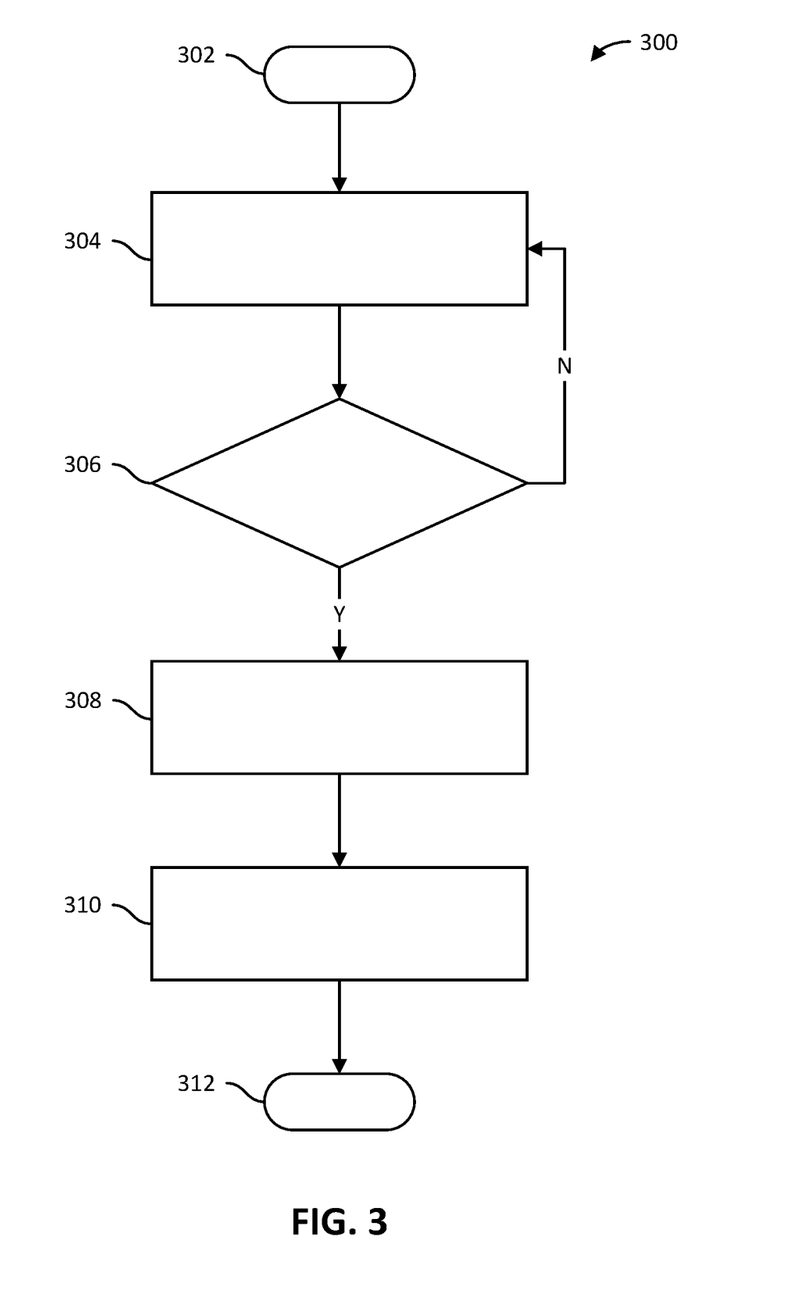
FIG. 3 illustrates a flowchart of a method of mitigating an oscillation of interest of a vehicle, according to one embodiment.

FIG. 3 illustrates a flowchart of a method 300 of mitigating an oscillation of interest of a vehicle, according to one embodiment. The method 300 begins at block 302.

At block 304, the oscillation mitigator 206 identifies an oscillation at the steering wheel 116 or the steering column 118 of the vehicle 100. In one embodiment, the oscillation mitigator 206 retrieves data about driving elements that can cause oscillations at the steering wheel 116 or the steering column 118 from the sensor data 212 and ECU data 214. Examples of these driving elements include motor torque measurements, steering torque measurements, wheel speed measurements, vehicle speed data, or the like. The driving elements can be represented as signal functions (e.g., cosine waves) in the sensor data 212 and ECU data 214. In one embodiment, the driving elements are represented as numbers, and the oscillation mitigator 206 can model the driving elements as signal functions. The oscillation mitigator 206 can also combine the driving elements signal functions to determine a combined signal function.

In one embodiment, the oscillation mitigator 206 uses Goertzel algorithms, or fast Fourier transform (FFT) techniques, to determine information about the combined signal function, such as a maximum amplitude, crest factor, and associated frequencies of the combined signal function across a frequency range (e.g., 10 Hz-40 Hz) that may cause vibrations at the steering wheel 116 or steering column 118.

At block 306, the oscillation mitigator 206 determines whether the oscillation exceeds an OOI threshold to determine if the oscillation is an OOI. In one embodiment, the oscillation mitigator 206 compares the maximum amplitude or the crest factor of the combined signal function to the OOI threshold. The OOI threshold may be determined based on empirical data that indicates an amplitude or crest factor that can cause oscillations at the steering wheel 116 or steering column 118.

Upon determining that the oscillation does not exceed the OOI threshold, the oscillation mitigator 206 determines that the oscillation is not an OOI because the oscillation is unlikely to cause a vibration at the steering wheel 116 or steering column 118. Hence, the method 300 proceeds to block 304, where further oscillations are identified as described above. However, upon determining that the oscillation does exceed the OOI threshold, the oscillation mitigator 206 determines that the oscillation is an OOI because the oscillation is likely to cause a vibration at the steering wheel 116 or steering column 118. The method 300 then proceeds to block 308.

At block 308, the oscillation mitigator 206 classifies a cause of the oscillation of interest. This process is described in further detail in FIGS. 4-5 herein.

At block 310, the oscillation mitigator 206 mitigates the oscillation of interest based on the classification of the cause. This process is described in further detail in FIGS. 6-7 herein. The method 300 ends at block 312.

Figure 4:
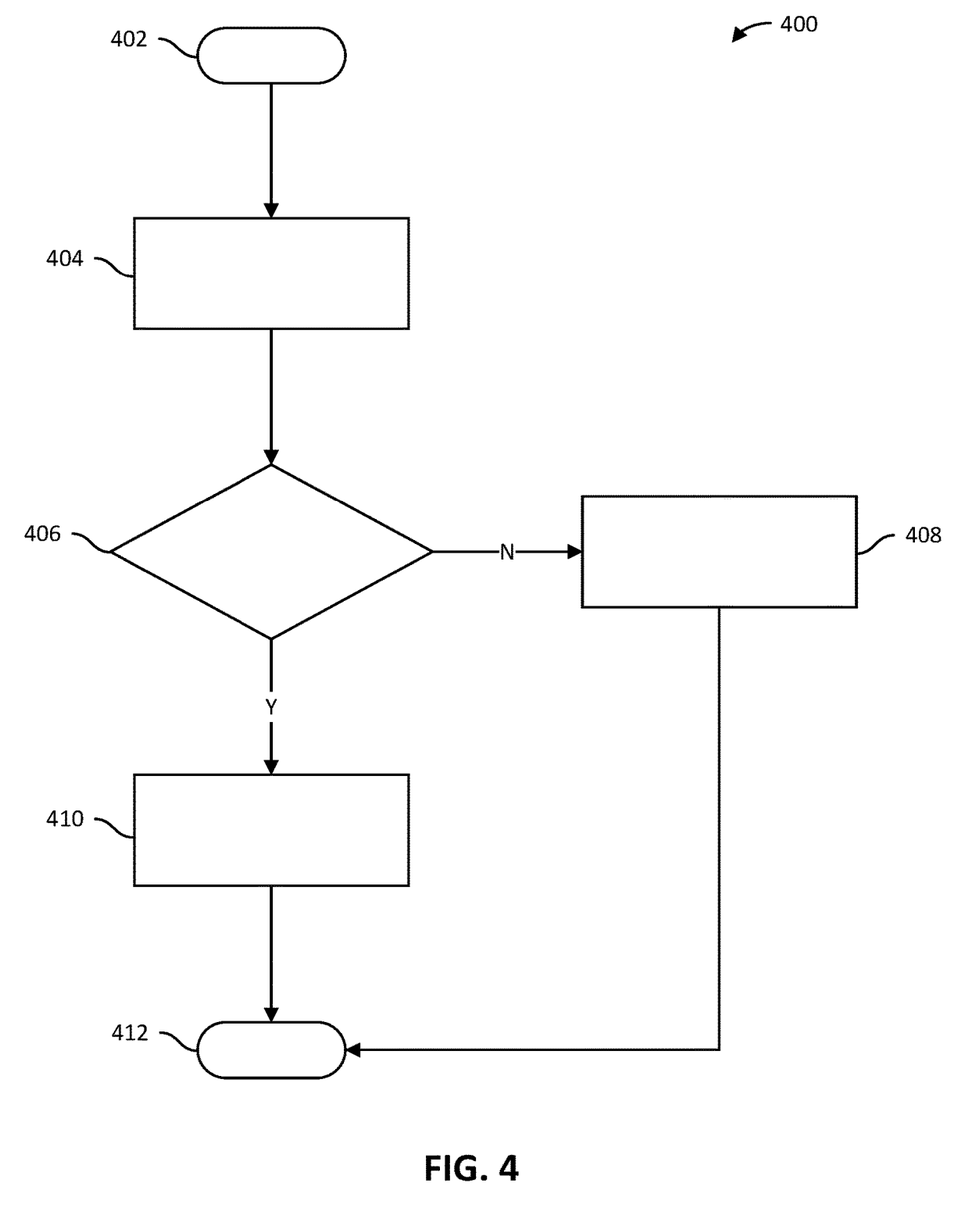
FIG. 4 illustrates a flowchart of a method of classifying a cause of an oscillation of interest, according to one embodiment.

FIG. 4 illustrates a flowchart of a method 400 of classifying a cause of an oscillation of interest, according to one embodiment. The method 400 begins at block 402.

At block 404, the oscillation mitigator 206 identifies a contributor to the oscillation of interest. In one embodiment, contributors to the OOI are measurements from the sensor system 240 and data from the ECUs $250_{1-N}$ that reflect issues with systems of the vehicle 100 (e.g., a braking system, the suspension system, the propulsion system 106, or the like) or other issues that impact a driving experience (e.g., poor road conditions) that may contribute to the OOI. Examples of the contributors include an oscillation harmonic of a wheel angular velocity, an oscillation harmonic of a deceleration of the vehicle, an IMU 132 measurement, a wheel displacement, an oscillation harmonic of the propulsion system 106, or the like.

At block 406, the oscillation mitigator 206 determines whether the contributor exceeds a contributor cause (CC) threshold. In one embodiment, the CC threshold is determined based on empirical data that identifies a value of a contributor that is likely to be a primary cause of the OOI. A different CC threshold can be determined for each contributor.

For example, when the IMU 132 measures movement of the vehicle 10 in a direction perpendicular to the road surface (e.g., a vertical acceleration of the vehicle 100), the oscillation mitigator 206 can compare the IMU 132 measurements to a CC threshold that represents values expected during driving experiences on poor road conditions (e.g., bumpy roads with numerous potholes). In this manner, when the IMU 132 measurements exceed the CC threshold, the oscillation mitigator 206 may determine that the oscillation is due to the road conditions instead of the EPS system.

In another example, the oscillation mitigator 206 can compare wheel displacement measurements from wheel displacement sensor 114 to a CC threshold that represents values expected when the suspension system is not performing optimally. In this manner, when the wheel displacement measurements exceed the CC threshold, the oscillation mitigator 206 may determine that the oscillation is due to a stressed or faulty suspension system instead of the EPS system.

Upon determining that the contributor does not exceed the CC threshold, the method 400 proceeds to block 408, where the oscillation mitigator 206 classifies the contributor as a non-cause of the OOI. In one embodiment, a non-cause classification represents a determination of the oscillation mitigator 206 that the contributor is unlikely to be a primary cause of the OOI. The method 400 then proceeds to block 412, where the method 400 ends.

However, returning to block 406, upon determining that the contributor does exceed the CC threshold, the method 400 proceeds to block 410. At block 410, the oscillation mitigator 206 classifies the contributor as a cause of the oscillation of interest. In one embodiment, an affirmative cause classification represents a determination of the oscillation mitigator 206 that the contributor that is likely to be a primary cause of the OOI. The method 400 ends at block 412.

Figure 5:
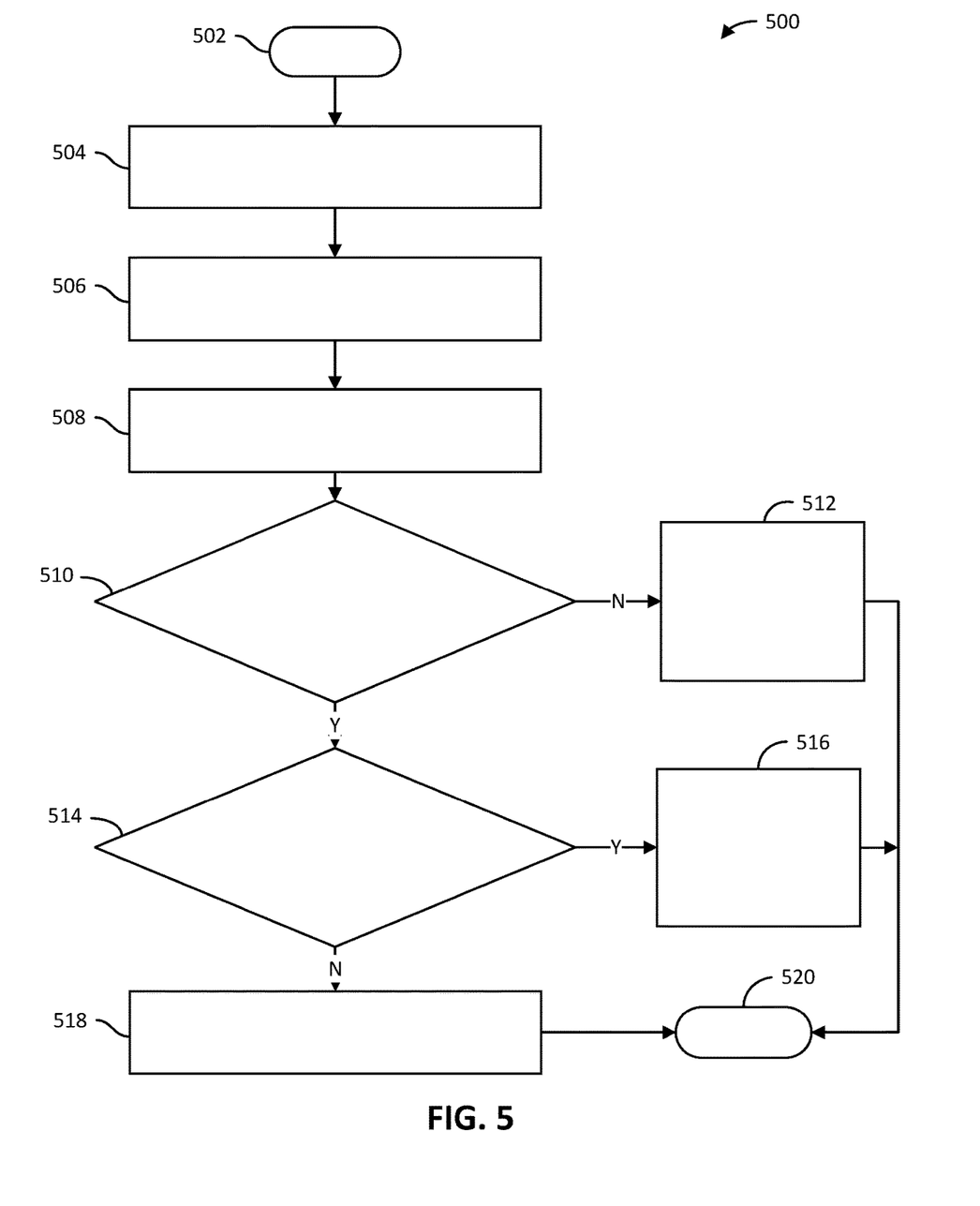
FIG. 5 illustrates a flowchart of a method of classifying a cause of an oscillation of interest, according to one embodiment.

FIG. 5 illustrates a flowchart of a method 500 of classifying a cause of an oscillation of interest, according to one embodiment. The method 500 begins at block 502.

At block 504, the oscillation mitigator 206 determines a first value of the OOI and a first value of an intervening contributor. In one embodiment, the first value of the OOI includes an amplitude of the OOI, a crest factor of the OOI, or another aspect of a signal that can be used to detect changes of the signal or the lack thereof.

In one embodiment, the intervening contributor represents a feature of the vehicle 100 or a driving experience that can contribute to the OOI, thereby interfering with the oscillation mitigator 206 when determining whether the OOI is caused by the EPS system. Examples of the intervening contributor include a vehicle speed, a steering wheel angle, a max steering wheel acceleration, a hands on/off detection (HOOD) status, or the like. Examples of the first value of the intervening contributor may include measurements from the sensor system 240, or data from the ECUs 250$_{1-N}$.

At block 506, the oscillation mitigator 206 reduces or disables assistance of a feature of the power steering system 115 of the vehicle 100. As discussed above, in the embodiment illustrated in FIG. 1, the power steering system 115 of the vehicle 100 is an EPS system. Examples of EPS features include road shake compensation, base steering wheel torque assistance, inertial compensation, speed-sensitive assistance, active steering wheel return, lane departure warnings, or the like.

In one embodiment, the oscillation mitigator 206 selects the power steering feature to reduce or disable based on an intervening contributor that reflects a driving condition associated with the power steering feature. For example, the oscillation mitigator 206 may select the base steering wheel torque assistance feature when the vehicle speed is below a threshold, since more steering wheel torque assistance can aid a driver in turning the vehicle 100 at low vehicle speeds. In another example, the oscillation mitigator 206 may select the road shake compensation feature when the vehicle speed exceeds a threshold and the steering wheel angle is below a threshold, since more road shake compensation can aid the driver when driving on a bumpy road on a relatively straight path at a high speed.

At block 508, the oscillation mitigator 206 determines a second value of the OOI and a second value of the intervening contributor. At block 510, the oscillation mitigator 206 determines whether a difference between the first and second values of the oscillation of interest indicates a reduction or elimination of the oscillation of interest.

In one embodiment, the oscillation mitigator 206 compares a difference between the first and second values of the OOI to an oscillation of interest reduction (OOIR) threshold to determine whether reducing or disabling assistance of the power steering feature resulted in a reduction or elimination of the OOI. In one embodiment, upon determining that the OOI has not been reduced or eliminated (e.g., when the difference between the first and second values of the OOI does not exceed the OOIR threshold), the method 500 proceeds to block 512.

At block 512, the oscillation mitigator 206 classifies the power steering feature as a non-cause of the OOI. In one embodiment, a non-cause classification represents a determination of the oscillation mitigator 206 that the power steering feature is unlikely to be a primary cause of the OOI, since reducing or disabling assistance of the power steering feature caused no significant change in the OOI. The method 500 then proceeds to block 520, where the method 500 ends. However, returning to block 510, upon determining that the OOI has been reduced or eliminated (e.g., when the difference between the first and second values of the OOI exceeds the OOIR threshold), the oscillation mitigator 206 proceeds to block 514.

At block 514, the oscillation mitigator 206 determines whether a difference between the first and second values of the intervening contributor indicates a change of the intervening contributor. In one embodiment, the oscillation mitigator 206 compares a difference between the first and second values of the intervening contributor to an intervening contributor cause (ICC) threshold to determine whether there was a change in the intervening contributor that is a primary cause of the reduction or elimination of the OOI. Upon determining that the difference between the first and second values of the intervening contributor exceeds the ICC threshold, the method 500 proceeds to block 516.

At block 516, the oscillation mitigator 206 classifies the power steering feature as an indeterminate cause of the OOI. In one embodiment, an indeterminate cause classification represents a determination of the oscillation mitigator 206 that there are potentially multiple causes of the reduction or elimination of the OOI. Given that the oscillation mitigator 206 previously determined that the intervening contributor experienced a significant change, the reduction or elimination of the OOI may have been caused by either the change in the intervening contributor or the reduced or disabled assistance of the power steering feature. Hence, the power steering feature may or may not be a primary cause of the OOI. The method 500 then proceeds to block 520, where the method 500 ends.

Returning to block 514, upon determining that the difference between the first and second values of the intervening contributor does not exceed the ICC threshold, the method 500 proceeds to block 518. At block 518, the oscillation mitigator 206 classifies the power steering feature as a cause of the OOI.

In one embodiment, an affirmative cause classification represents a determination of the oscillation mitigator 206 that reducing or disabling assistance of the power steering feature is the cause of the reduction or elimination of the OOI. Hence, the power steering feature is a primary cause of the OOI.

In one embodiment, the method 500 is performed for each feature of the power steering system 115. When the oscillation mitigator 206 determines that all of the power steering features assessed via the method 500 are classified as indeterminate causes, the oscillation mitigator 206 can classify the cause of the OOI as unknown. The method 500 ends at block 520.

Figure 6:
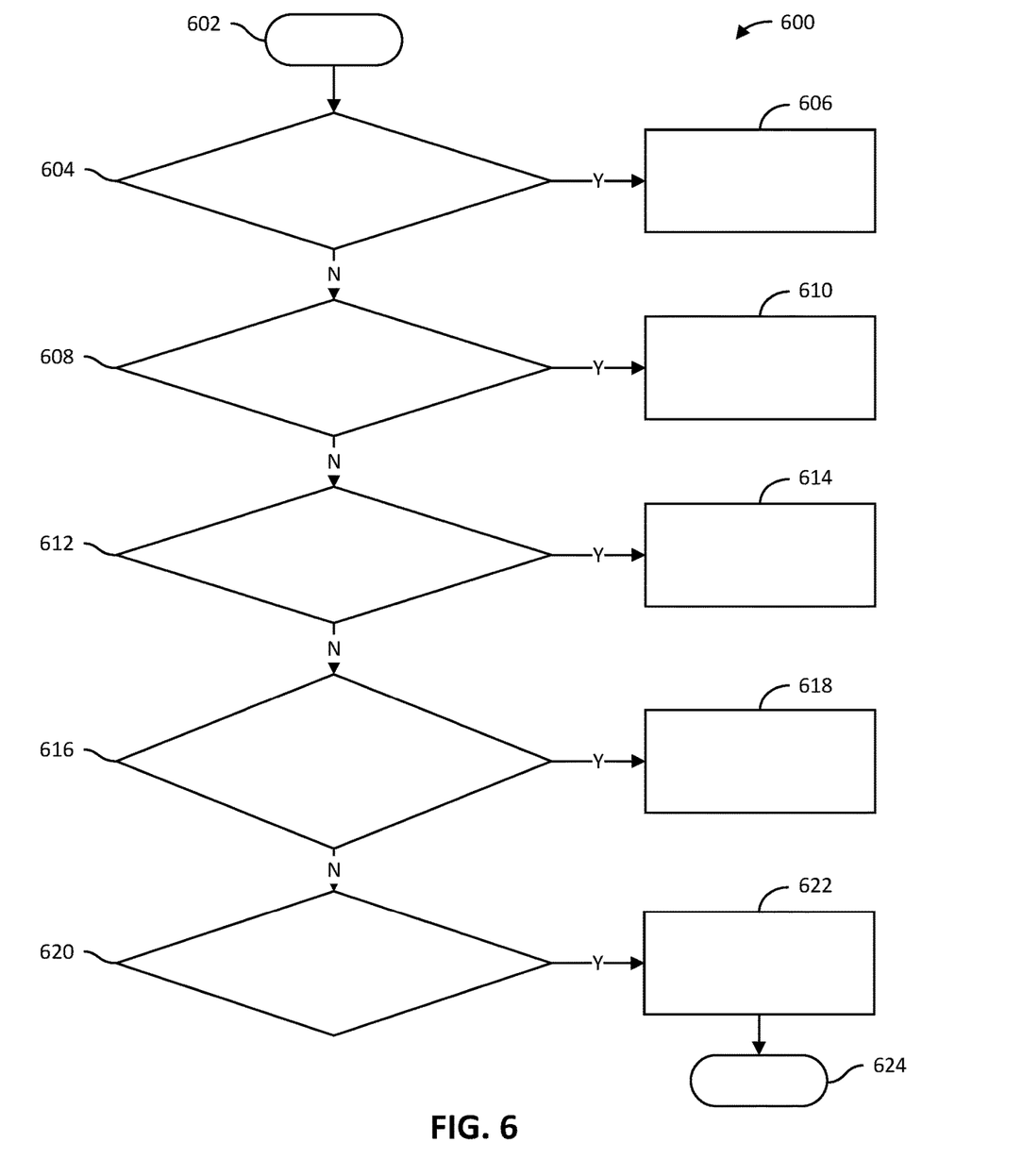
FIG. 6 illustrates a flowchart of a method of mitigating an oscillation of interest based on a cause of the oscillation of interest.

FIG. 6 illustrates a flowchart of a method 600 of mitigating an oscillation of interest based on a cause of the oscillation of interest, according to one embodiment. The method 600 begins at block 602.

At block 604, the oscillation mitigator 206 determines whether a contributor is classified as a cause of the oscillation of interest. Upon determining that the contributor is classified as a cause of the OOI, the method 600 proceeds to block 606.

At block 606, the oscillation mitigator 206 stops the vehicle 100 from moving. In addition to (or in lieu of) stopping the vehicle 100, the oscillation mitigator 206 can generate an alert or notification for a driver of the vehicle 100 to bring the vehicle 100 to a stop. Returning to block 604, upon determining that the contributor is not classified as a cause of the OOI, the method 600 proceeds to block 608.

At block 608, the oscillation mitigator 206 determines whether a power steering feature is classified as a non-cause of the oscillation of interest. Upon determining that the power steering feature is classified as a non-cause of the OOI, the method 600 proceeds to block 610.

At block 610, the oscillation mitigator 206 increases or enables the power steering feature. As discussed above, the oscillation mitigator 206 reduced or disabled assistance of the power steering feature to determine whether power steering feature is a cause of the OOI. Hence, since the oscillation mitigator 206 has determined that the power steering feature is not a cause of the OOI, the power steering feature can be restored to aid the driver without affecting the OOI. Returning to block 608, upon determining that the power steering feature is not classified as a non-cause of the OOI, the method 600 proceeds to block 612.

At block 612, the oscillation mitigator 206 determines whether the power steering feature is classified as a cause of the oscillation of interest. Upon determining that the power steering feature is classified as a cause of the OOI, the method 600 proceeds to block 614.

At block 614, the oscillation mitigator 206 maintains the reduced or disabled assistance of the power steering feature. Returning to block 612, Upon determining that the power steering feature is not classified as a cause of the OOI, the method 600 proceeds to block 616.

At block 616, the oscillation mitigator 206 determines whether the power steering feature is classified as an indeterminate cause of the oscillation of interest. Upon determining that the power steering feature is classified as an indeterminate cause of the OOI, the method 600 proceeds to block 618.

At block 618, the oscillation mitigator 206 abstains from mitigating the oscillation of interest. As discussed above, when a power steering feature is classified as an indeterminate cause of the OOI, there may be multiple causes of the OOI. Hence, the oscillation mitigator 206 may abstain from mitigating the OOI to avoid unnecessarily affecting the driving experience (e.g., by disabling a power steering feature, by bringing the vehicle 100 to a stop). Returning to block 616, upon determining that the power steering feature is not classified as an indeterminate cause of the OOI, the method 600 proceeds to block 620.

At block 620, the oscillation mitigator 206 determines whether a primary cause of the oscillation of interest is classified as unknown. Upon determining that the primary cause of the OOI is classified as unknown, the method 600 proceeds to block 622.

At block 622, the oscillation mitigator 206 reduces a torque of a steering motor 124 of the vehicle 100. After the oscillation mitigator 206 reduces the torque, the oscillation mitigator can assess changes in the OOI and an intervening contributor via a process similar to the process described in FIG. 5. In one embodiment, when the OOI is reduced or eliminated, the oscillation mitigator 206 maintains the reduced torque of the steering motor 124. In another embodiment, when the OOI is not reduced or eliminated, the oscillation increases the torque of the steering motor 124. The method 600 ends at block 624.

Figure 7:
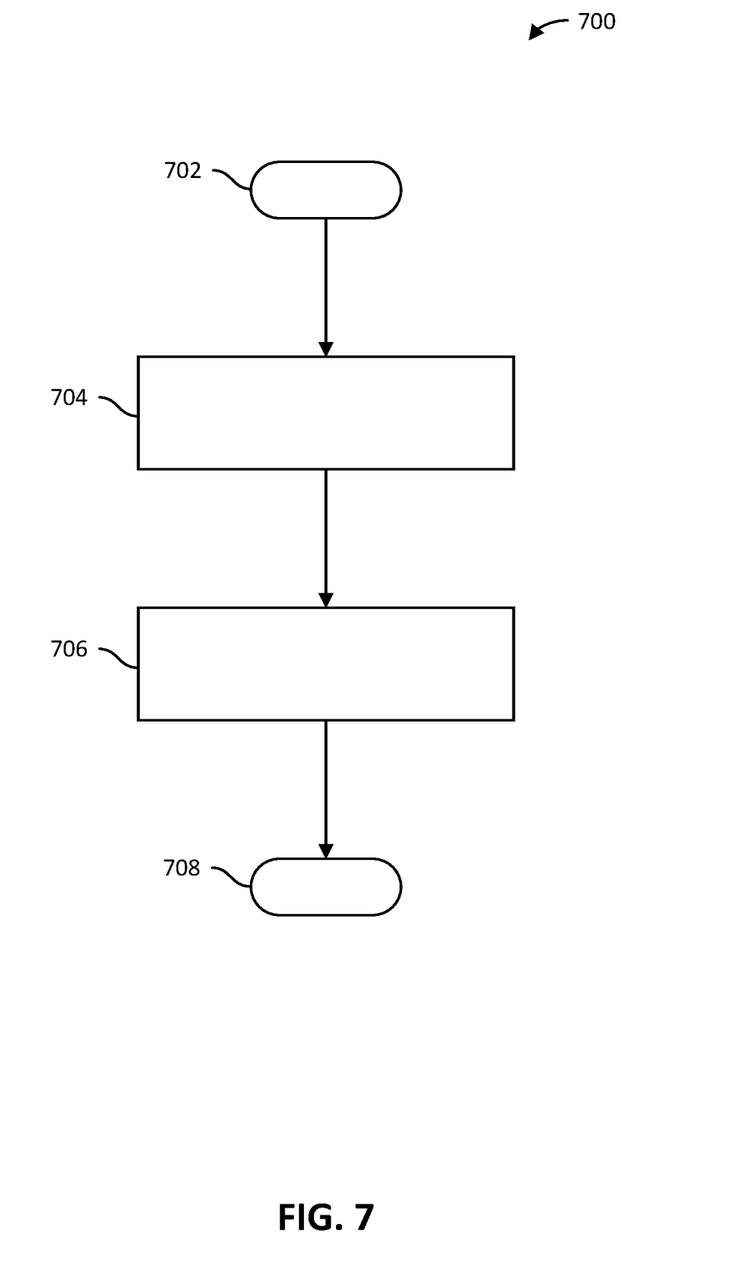
FIG. 7 illustrates a flowchart of a method of adjusting an oscillation mitigation, according to one embodiment.

FIG. 7 illustrates a flowchart of a method of adjusting an oscillation mitigation, according to one embodiment. The method 700 begins at block 702.

In one embodiment, a machine learning model is trained via a supervised learning process to determine driving scenarios based on vehicle features. After the machine learning model is trained, the machine learning model can be stored in a memory or storage of at least one of the ECUs $250_{1\text{-}N}$.

At block 704, a machine learning algorithm 208 determines, via the machine learning model, a driving scenario score based on a vehicle feature. In one embodiment, the vehicle feature includes measurements from the sensor system 240, and data from the ECUs $250_{1\text{-}N}$. Examples of the vehicle feature include a vehicle speed, steering wheel angle, steering wheel angle gradient, yaw rate of the wheels 110, or the like.

The driving scenarios can represent highway driving (characterized by high vehicle speeds and relatively small steering wheel angles and yaw rates), city driving (characterized by low vehicle speeds and relatively large steering wheel angles), danger avoidance driving (characterized by high yaw rates and extreme steering wheel angles), or the like. In one embodiment, the driving scenarios are represented as scores output by the machine learning model. The driving scenario score may be a value from ranging from 0-1.

At block 706, the machine learning algorithm 208 adjusts a mitigation of the oscillation of interest based on the driving scenario score. In one embodiment, the machine learning algorithm 208 adjusts the mitigation techniques by multiplying a value of the mitigation technique by the driving scenario score.

For example, as discussed above in FIG. 6, one mitigation technique includes stopping the vehicle 100 from moving (reducing the speed by 100%). Assuming the driving scenario score determined from the machine learning model is 0.6, the machine learning algorithm can adjust the mitigation technique reduce the speed of the vehicle by 60% instead of 100%. In another example, a mitigation technique may include increasing an assistance of a power steering feature by 30%. Assuming the driving scenario score determined from the machine learning model is 0.5, the machine learning algorithm can adjust the mitigation technique increase the assistance by 15% instead of 30%.

In another embodiment, the machine learning algorithm 208 can replace the value of the mitigation technique with the driving scenario score. For example, a mitigation technique that reduces a torque of the steering motor 124 by 50% may instead reduce the torque by a driving scenario score of 0.1 or 10%. The method 700 ends at block 708.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method comprising:
identifying an oscillation at a steering wheel or steering column of a vehicle;
upon determining that the oscillation exceeds an oscillation of interest threshold, identifying the oscillation as an oscillation of interest;
classifying a cause of the oscillation of interest, wherein the cause of the oscillation of interest comprises a power steering feature, and wherein classifying the power steering feature comprises:
obtaining a first value of the oscillation of interest;
reducing or disabling an assistance of the power steering feature;
obtaining a second value of the oscillation of interest after the assistance of the power steering feature has been reduced or disabled;
assessing a difference between the first value and second value; and
based on the difference between the first value and second value does not exceed a first threshold value classifying the power steering feature as a non-cause of the oscillation;
based on the difference between the first value and second value exceeds the first threshold value and does not exceed a second threshold value, classifying the power steering feature as an intervening cause of the oscillation;
based on the difference between the first value and second value exceeds the first threshold value and the second threshold value, classifying the power steering feature as a primary cause of the oscillation; and
mitigating the oscillation of interest based on the classification of the cause.

2. The method of claim 1, further comprising:
determining a driving scenario score based on vehicle features of the vehicle, wherein the vehicle features include at least one of: (i) a vehicle speed, (ii) a steering wheel angle, (iii) a steering wheel angle gradient, or (iv) a yaw rate of wheels of the vehicle; and
adjusting the mitigation of the oscillation of interest based on the driving scenario score.

3. The method of claim 1, wherein the cause of the oscillation of interest comprises one of: (i) a contributor, (ii) an intervening contributor, or (iii) the power steering feature, and wherein the cause is classified as one of: (i) a cause of the oscillation of interest, (ii) a non-cause of the oscillation of interest, or (iii) an indeterminate cause of the oscillation of interest.

4. The method of claim 3, wherein upon determining that a first cause and a second cause comprise a respective first and second power steering feature, and upon determining that the first and second power steering features are classified as indeterminate causes of the oscillation of interest, the cause of the oscillation of interest is classified as unknown.

5. The method of claim 3, wherein the contributor includes at least one of: (i) an oscillation harmonic of a wheel angular velocity, (ii) an oscillation harmonic of a deceleration of the vehicle, (iii) an IMU measurement, (iv) a wheel displacement, or (v) an oscillation harmonic of a propulsion system of the vehicle, and wherein classifying the contributor involves comparing the contributor to a contributor cause threshold.

6. The method of claim 1, wherein mitigating the oscillation of interest includes at least one of: (i) stopping the vehicle, (ii) increasing or enabling assistance of a power steering feature, (iii) maintaining a reduced or disabled assistance of a power steering feature, or (iv) reducing a torque of a steering motor of the vehicle.

7. The method of claim 1, wherein the first threshold is an oscillation of interest reduction threshold and the second threshold is a intervening contributor cause threshold.

8. The method of claim 1, wherein based on a classification of the power steering feature as the non-cause of the oscillation, the mitigating includes increasing or enabling the power steering feature, and based on a classification of the power steering feature as the primary cause of the oscillation, the mitigating includes maintaining the reduced or disabled assistance of the power steering feature.

9. A system, comprising:
a processor; and
memory or storage comprising an algorithm or computer instructions, which when executed by the processor, performs an operation comprising:
identifying an oscillation at a steering wheel or steering column of a vehicle;
upon determining that the oscillation exceeds an oscillation of interest threshold, identifying the oscillation as an oscillation of interest;
classifying a cause of the oscillation of interest, wherein the cause of the oscillation of interest comprises a power steering feature, and wherein classifying the power steering feature comprises:
obtaining a first value of the oscillation of interest;
reducing or disabling an assistance of the power steering feature;
obtaining a second value of the oscillation of interest after the assistance of the power steering feature has been reduced or disabled;
assessing a difference between the first value and second value; and
based on the difference between the first value and second value does not exceed a first threshold value classifying the power steering feature as a non-cause of the oscillation;
based on the difference between the first value and second value exceeds the first threshold value and does not exceed a second threshold value, classifying the power steering feature as an intervening cause of the oscillation;
based on the difference between the first value and second value exceeds the first threshold value and the second threshold value, classifying the power steering feature as a primary cause of the oscillation; and
mitigating the oscillation of interest based on the classification of the cause.

10. The system of claim 9, the operation further comprising:
determining a driving scenario score based on vehicle features of the vehicle, wherein the vehicle features include at least one of: (i) a vehicle speed, (ii) a steering wheel angle, (iii) a steering wheel angle gradient, or (iv) a yaw rate of wheels of the vehicle; and
adjusting the mitigation of the oscillation of interest based on the driving scenario score.

11. The system of claim 9, wherein the cause of the oscillation of interest comprises one of: (i) a contributor, (ii) an intervening contributor, or (iii) a power steering feature, and wherein the cause is classified as one of: (i) a cause of the oscillation of interest, (ii) a non-cause of the oscillation of interest, or (iii) an indeterminate cause of the oscillation of interest.

12. The system of claim 11, wherein upon determining that a first cause and a second cause comprise a respective first and second power steering feature, and upon determining that the first and second power steering features are classified as indeterminate causes of the oscillation of interest, the cause of the oscillation of interest is classified as unknown.

13. The system of claim 11, wherein the contributor includes at least one of: (i) an oscillation harmonic of a wheel angular velocity, (ii) an oscillation harmonic of a deceleration of the vehicle, (iii) an IMU measurement, (iv) a wheel displacement, or (v) an oscillation harmonic of a propulsion system of the vehicle, and wherein classifying the contributor involves comparing the contributor to a contributor cause threshold.

14. The system of claim 9, wherein mitigating the oscillation of interest includes at least one of: (i) stopping the vehicle, (ii) increasing or enabling assistance of a power steering feature, (iii) maintaining a reduced or disabled assistance of a power steering feature, or (iv) reducing a torque of a steering motor of the vehicle.

15. A computer-readable storage medium having a computer-readable program code embodied therewith, the computer-readable program code executable by one or more computer processors to perform an operation comprising:
identifying an oscillation at a steering wheel or steering column of a vehicle;
upon determining that the oscillation exceeds an oscillation of interest threshold, identifying the oscillation as an oscillation of interest;
classifying a cause of the oscillation of interest, wherein the cause of the oscillation of interest comprises a power steering feature, and wherein classifying the power steering feature comprises:
obtaining a first value of the oscillation of interest;
reducing or disabling an assistance of the power steering feature;
obtaining a second value of the oscillation of interest after the assistance of the power steering feature has been reduced or disabled;
assessing a difference between the first value and second value; and
based on the difference between the first value and second value does not exceed a first threshold value classifying the power steering feature as a non-cause of the oscillation;
based on the difference between the first value and second value exceeds the first threshold value and does not exceed a second threshold value, classifying the power steering feature as an intervening cause of the oscillation;
based on the difference between the first value and second value exceeds the first threshold value and the second threshold value, classifying the power steering feature as a primary cause of the oscillation; and
mitigating the oscillation of interest based on the classification of the cause.

16. The computer-readable storage medium of claim 15, the operation further comprising:
determining a driving scenario score based on vehicle features of the vehicle, wherein the vehicle features include at least one of: (i) a vehicle speed, (ii) a steering wheel angle, (iii) a steering wheel angle gradient, or (iv) a yaw rate of wheels of the vehicle; and
adjusting the mitigation of the oscillation of interest based on the driving scenario score.

17. The computer-readable storage medium of claim 15, wherein the cause of the oscillation of interest comprises one of: (i) a contributor, (ii) an intervening contributor, or (iii) a power steering feature, and wherein the cause is classified as one of: (i) a cause of the oscillation of interest, (ii) a non-cause of the oscillation of interest, or (iii) an indeterminate cause of the oscillation of interest.

18. The computer-readable storage medium of claim 17, wherein upon determining that a first cause and a second cause comprise a respective first and second power steering feature, and upon determining that the first and second power steering features are classified as indeterminate causes of the oscillation of interest, the cause of the oscillation of interest is classified as unknown.

19. The computer-readable storage medium of claim 15, wherein mitigating the oscillation of interest includes at least one of: (i) stopping the vehicle, (ii) increasing or enabling assistance of a power steering feature, (iii) maintaining a reduced or disabled assistance of a power steering feature, or (iv) reducing a torque of a steering motor of the vehicle.

20. The computer-readable storage medium of claim 15, wherein based on a classification of the power steering feature as the non-cause of the oscillation, the mitigating includes increasing or enabling the power steering feature, and based on a classification of the power steering feature as the primary cause of the oscillation, the mitigating includes maintaining the reduced or disabled assistance of the power steering feature.

\* \* \* \* \*